I. SIMPSON.
Crusher, Harrow and Roller.
No. 84,386.
Patented Nov. 24, 1868.
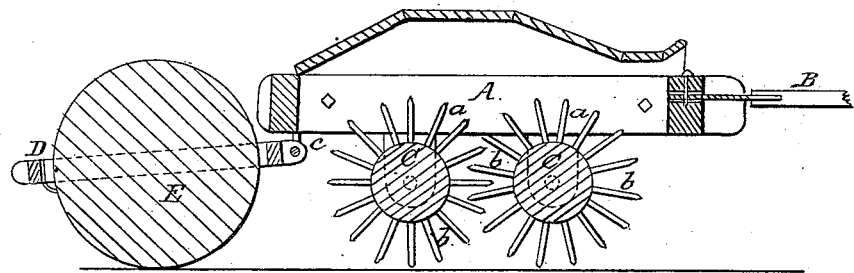
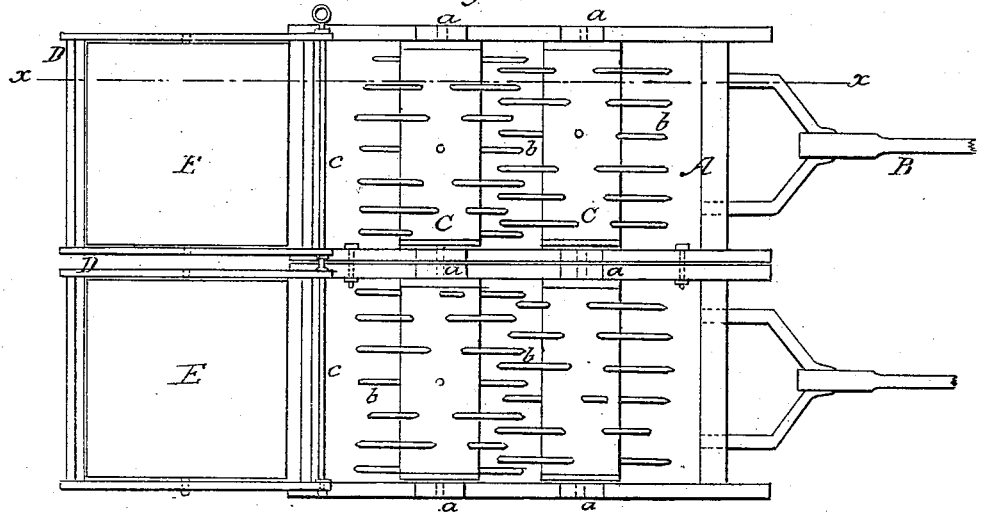
Witnesses.
Wm A Morgan
G. C. Cotton
Inventor.
J. Simpson

JOHN SIMPSON, OF CHARLESTON, ILLINOIS.

Letters Patent No. 84,386, dated November 24, 1868.

IMPROVEMENT IN COMBINED CRUSHER, HARROW, AND ROLLER.

The Schedule referred to in these Letters Patent and making part of the same.

*To all whom it may concern:*

Be it known that I, JOHN SIMPSON, of Charleston, in the county of Coles, and State of Illinois, have invented a new and useful Improvement in a Combined Crusher, Harrow, and Roller; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\ x$, fig. 2.

Figure 2 is an inverted plan of the same.

Similar letters of reference indicate like parts.

This invention relates to a new and improved device for crushing, harrowing, and rolling the soil, for the purpose of rendering the same light and friable, to favor the growth of crops.

In the accompanying sheet of drawings—

A represents a rectangular frame, which has a draught-pole, B, attached to its front end, and C C are two cylinders, which have their bearings, $a\ a$, attached to the frame A, said cylinders having a transverse position relatively with the frame A, and parallel with each other.

The cylinders are armed with radial teeth, $b$, arranged in rows circumferentially, the rows of teeth of one cylinder being in line with the centres of the spaces between the teeth on the other cylinder, the teeth of the two cylinders lapping over each other, so that they will operate as cleaners, and prevent clogging or choking up.

The toothed cylinders, as the machine is drawn along, rotate, and effectually break or crush clods of earth, and pulverize the soil, rendering it loose and friable.

To the rear part of the frame A there are attached, by joints $c$, two frames, D D, in each of which a roller, E, is fitted, and allowed to rotate freely. These rollers perform the usual function of levelling and compacting the surface of the earth.

It may be desirable in many cases to have the implement constructed of two narrow frames, A, bolted together, and provided with short-toothed cylinders C C, and having a roller-frame, D, attached to the rear of each frame A, as shown in fig. 2.

This arrangement admits of the device being converted from a double to a single-horse implement, and *vice versa*, with the greatest facility.

Having thus described my invention,

I claim as new, and desire to secure by Letters Patent—

The rollers E, fitted in the frames D, attached to the frame A, as shown, in combination with the toothed cylinders C C, all arranged substantially as and for the purpose specified.

JOHN SIMPSON.

Witnesses:
D. C. AMBLER,
JOSEPH SPERRY.